United States Patent [19]

Bailey

[11] Patent Number: 4,927,647
[45] Date of Patent: May 22, 1990

[54] ANTI-STICK PACKAGE FOR HYGROSCOPIC FOODS

[75] Inventor: Jennifer A. Bailey, Winston-Salem, N.C.

[73] Assignee: R. J. Reynolds Tobacco Company, Winston-Salem, N.C.

[21] Appl. No.: 277,464

[22] Filed: Nov. 23, 1988

Related U.S. Application Data

[63] Continuation of Ser. No. 73,797, Jul. 13, 1987, abandoned.

[51] Int. Cl.⁵ ................................................. A23L 3/00
[52] U.S. Cl. .................................... 426/126; 426/127; 426/410; 426/415; 428/317.1; 428/314.4; 428/35.2; 264/45.4
[58] Field of Search .............. 426/126, 127, 106, 415, 426/410; 428/319.1, 317.1, 317.7, 35, 314.4, 314.8, 35.2, 36.5; 264/45.4, 46.4

[56] References Cited

U.S. PATENT DOCUMENTS

| | | |
|---|---|---|
| 3,306,755 | 2/1967 | Sincock et al. ............... 426/106 |
| 3,415,661 | 12/1968 | Sincock ........................ 426/125 |
| 3,645,757 | 2/1972 | Gordon et al. ................ 426/811 |
| 3,823,047 | 7/1974 | Columbo ..................... 428/314.4 |
| 3,922,236 | 11/1975 | Pierce ........................... 426/396 |
| 3,930,917 | 1/1976 | Esakov et al. ............... 428/319.1 |
| 4,698,254 | 10/1987 | Raszewski .................. 428/319.1 |

OTHER PUBLICATIONS

Modern Packaging Encyclopedia, pp. 148, 150, 161, McGraw Hill, Inc., N.Y., vol. 44, 1971.
F. R. Nissel, "Extruding Thermoplastic Foams", *Modern Plastics Encyclopedia*, 1985–1986, pp. 236–237.

*Primary Examiner*—Donald E. Czaja
*Assistant Examiner*—Helen Pratt
*Attorney, Agent, or Firm*—Grover M. Myers

[57] ABSTRACT

A flexible laminate film for packaging hygroscopic products, including foods, is disclosed in which the packaged contents do not adhere or stick to the inner surface of the package. The inner layer of the package laminate provides the anti-stick characteristic of the package and comprises a polystyrene foam.

10 Claims, 1 Drawing Sheet

ANTI-STICK PACKAGE FOR HYGROSCOPIC FOODS

This is a continuation of co-pending application Ser. No. 07/073,797 filed on 7/13/87, now abandoned.

FIELD OF THE INVENTION

The present invention relates generally to food packages, and more particularly to anti-stick laminated films for packaging hygroscopic foods.

DESCRIPTION OF THE PRIOR ART

When hygroscopic foods, e.g., dried fruits, dried fruit candies, are packaged, undesirable adhesion occurs between the food and the inner surface of the package due to moisture absorption by the food. Where the package is transparent, the resulting adhesion may be render the product unsightly and/or will make removal of the food product difficult. Additionally, the absorption of moisture will result in a change in the character (or appearance) of normally dried foodstuffs, e.g., by wilting, and consequently, the product loses its appeal to the consumer.

A search of the prior art was undertaken to ascertain whether this problem has heretofore been addressed, with the following results:

U.S. Pat. No. 3,922,362 discloses the use of expanded polystyrene as a shipping container for food material, such as produce comprising fresh fruits and vegetables.

U.S. Pat. No. 3,645,757 discloses a method for treating the surface of packaging material to provide a hydrocolloidal release coating for foods such as cheese, margarine and some types of candy.

U.S. Pat. Nos. 3,306,755 and 3,415,661 disclose the use of polystyrene film for packaging moisture-containing foods and particularly the use of an anti-fogging coating on the film.

There are many uses suggested for polystyrene foamed products. In the article "Extruding Thermoplastic Foams" by F.R. Nissel, MODERN PLASTICS ENCYCLOPEDIA 1985-1986, pages 236-237, the author states: "Thin polystyrene foam film has an attractive satin-like sheen. It usually is extruded on conventional tubular film equipment using impregnated beads as raw material. It is widely used for coaster, food tray liners, and wrapping material because of its non-slip characteristics and appearance."

Frm the foregoing, it is clear that none of the references uncovered offers a satisfactory solution to the problem addressed herein.

Thus, it will be apparent that there exists a need in the art for a flexible laminated film for packaging hygroscopic articles, in particular, dried fruit and dried fruit candy, such film being moisture resistant and possessing anti-stick characteristics.

SUMMARY OF THE INVENTION

It is therefore a primary object of the present invention to provide a flexible laminated package having an inner surface which will not adhere to hygroscopic products, particularly, dried fruit and dried fruit candies.

A further object of the present invention is to provide a laminated package which will inhibit moisture loss or absorption by the product contained therein.

A still further object of the present invention is to provide a laminated food package which is capable of being made at relatively low cost using conventional packaging equipment.

It is yet another object of the present invention to provide a multilayered film for making the packages described above.

These and other objects and advantages of the present invention will be apparent from the description which follows.

Broadly stated, the flexible laminated film (and package) of the present invention comprises a plurality of layers wherein the inner film layer is polystyrene foam. It has been unexpectedly found that a polystyrene foam film layer in contact with hygroscopic food will not adhere to the food. While not wishing to be bound by any theory, one possible explanation for the unexpected anti-stick properties of the polystyrene foam is the fact that, when viewed under a miscroscope, the foam surface is not flat but is somewhat dimply so that there is less contact between the surface and the material placed adjacent thereto.

DESCRIPTION OF THE PREFERRED EMBODIMENTS

Figure 1:
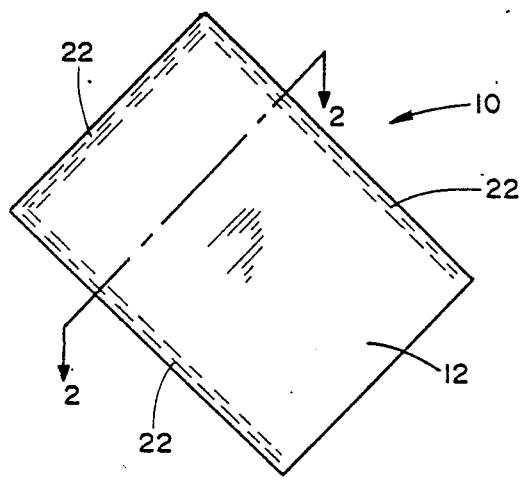
FIG. 1 is a perspective view of a food package according to the present invention.

The polystyrene foam films or foils useful in the present invention are commercially available from a number of different suppliers. One such supplier is Amoco Foam Products Company, of Chippewa Falls, Wisconsin. The thickness of the foam layer is not important except that if the foam is too thick, the laminate will lose its flexibility; whereas, if the foam layer is too thin, it cannot be machined properly to provide a multilayer laminate. With this in mind, the layer can range anywhere from a few mils thick up to greater than 25 mils thick. Preferably, the foam layer being used has a thickness of about 7 mils. Suitable films can be obtained from Velcour, Inc. of Glen Falls, N.Y.

Polystyrene foam sheets are conventionally produced using resin, nucleator, and blowing agent. The resin is normally a high heat general-purpose polystyrene. Nucleators, such as talc or a citric acid-sodium bicarbonate mixture, are added to provide foaming sites to obtain the desired cell size and uniformity. The blowing agent, usually a fluorocarbon or light aliphatic hydrocarbon, is injected as a liquid into the primary extruder. A positive-displacement volumetric pump is generally used, and the addition port is usually approximately ⅜ of the way up the barrel of the primary extruder. The amount and type of blowing agent control the density of the foam produced.

The physical characteristics of the polystyrene foam film layer include: a high compressive stress, a very low or no water absorption, and a non-planar surface. While not wishing to be bound by theory, these characteristics are believed to provide the non-stick surface. The high compressive stress is believed to provide a recoil like property in the foam sheet. Thus, when pressure is appled to the packaged food which would tend to make a food stick to the surface of the film, an internal force is believed to be built up within the foam layers such that when the pressure is removed, the foam surface tends to push itself away from the surface of the food. Thus, the film can be suitably machined for lamination to other film layers. The lack of water absorption in the film also prevents sticking.

To the polystyrene foam film layer substrate one or more additional layers are preferably added to provide desirable functional characteristics, such as barrier properties. The additional layers should not be so thick as to render the resultant laminate non-flexible. Such layers include one or more films of paper, polyolefins, vinyls, ionomers, styrene polymers and copolymers, polyamides, polyesters, metallized films, metallized papers, or combinations of such films. The thickness of the additional films is not critical and can typically range from about 0.25 mils up to 25 mils (0.00025 inches to 0.025 inches).

Although any number of layers may be added to the polystyrene substrate, it is preferred that two layers be used for economic reasons. One layer is the polystyrene foam film layer. The other layer is preferably a barrier layer, such as foil, oriented nylon, metallized films or the like. Where it is desirable to have printing on the exterior surface of the laminate, a third, printable, exterior layer can be included. All of the structures will typically include adhesive layers between the film layers. Thus, one preferred flexible laminate comprises the combination of polystyrene foam/polyethylene/foil/paper. The intermediate foil serves as a moisture barrier and the outer paper layer is adapted to receive printing or the like.

In order to laminate the various layers employed, a suitable conventional adhesive known to those skilled in the art may be used. In laminating polystyrene foam to another film, care must be taken because the polystyrene is very solvent sensitive. Preferred adhesives are thus water based adhesives, the chemical composition of which will depend upon the film to be bonded to the polystyrene foam film. Alternatively, solventless adhesives can be used and the choice of solventless adhesive to be selected is within the skill in the art. Finally, if it is desired to use a solvent based adhesive, the dry bonding process is preferred wherein the film to be bonded to the polystyrene foam is coated with the solvent based adhesive. Then, the coated film is passed through an oven to remove the solvent and the two films are then joined together by pressure.

Packages made from the flexible polystyrene foam laminate of the present invention may be readily and economically produced using conventional equipment.

Since polystyrene foam is difficult to bond to itself by thermo-sealing, the inner layer of the package is modified by applying a hot seal coating or a cold seal adhesive along the portions to be bonded. Most heat seal coatings are solvent based and they will generally produce less successful results than cold seal adhesives which are water based. Water based systems are preferred because of the susceptibility of polystyrene foam to various solvents. These sealable coatings are generally known to those skilled in the art and typically consist of a water based dispersion of a rubber or modified rubber. Various properties of the coating may be desirable. For example, an abrasion-resistant of "harder" coating is preferred when the coating is likely to come into contact with machine surfaces. One preferred heat seal coating is a copolymer based, water based dispersion commercially available from Pearson and Stevens Industrial Group, Buffalo, N.Y., under the tradename LATTISEAL A7734A.

Having described the present invention in general terms, the following examples will more particularly illustrate the package aspects of the present invention with reference to the drawing.

EXAMPLE

(Present Invention)

Figure 2:
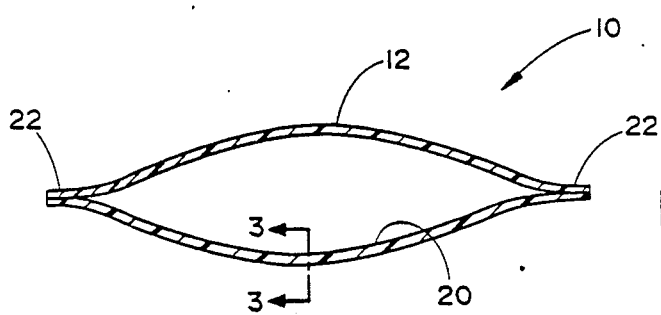
FIG. 2 is a cross-sectional view of the package of FIG. 1 taken along line 2—2.
Figure 3:
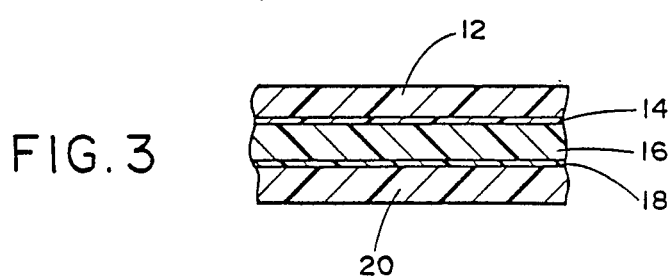
FIG. 3 is a fragmentary detail showing the structure of the flexible laminate film of the invention taken along line 3—3 of FIG. 2.

As shown in FIGS. 1-3 of the drawings, a laminated package 10 was prepared having an outer layer 12 of 15 lb./R paper, which was joined by an adhesive 14 to a 0.00285" thick foil intermediate layer 16, which in turn was joined by an adhesive 18 to a polystyrene foam inner layer 20. The polystyrene foamed film layer employed has a density of 6.87 lbs. per 1000 sq. ft. of 0.007 in. thick film, or 11.8 lbs. per cubic foot. A cold seal was applied to the polystyrene layer along its outer edges 22 so as to form the package 10. The package was formed and filled with a hygroscopic food, e.g., 0.9 ounces of a dried fruit product known as FRUIT WRINKLES®. The filled package of the present invention was then tested to ascertain whether product adhesion with the inner layer of the package occurred. The package was closed, then subjected to a pressure of 9.63 pounds per square inch. When the package was opened at the top and inspected, there was no evidence of adhesion between the food and the inner layer of the package.

COMPARATIVE EXAMPLES

A. In contrast to the non-adhering characteristics of the package of the present invention, conventional packages for hygroscopic foods comprising polyethylene/ foil/Surlyl® (treated with adhesion inhibitor) were reported to have food adhering to the inner walls of the packages. Additionally, other substrates which have tested unsatisfactorily for anti-stick properties for hygroscopic foods include biaxially oriented polypropylene, foamed polypropylene, embossed polyethylene, various biaxially oriented polypropylene release film (which include release coatings); DuPont 50XM-831 C-PET (Release coated crystallized polyethylene terephthalate); paper which has been coated with a lethicin solution (which is used as a release coating in the baking industry); paper having a glassine interior surface; and papers having various waxed interior surfaces.

B. One commercial package comprises multiple layers according to the following specification: 20 lb./R paper/10 lb./R LLDPE/0.000285" foil/15 lb./R Surlyn® (slip coated). The internal Surlyn® layer was treated with a slip additive to inhibit product adhesion; however, the product adhered to the internal layer.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A packaged dried fruit candy hygroscopic food stuff comprising a hygroscopic foodstuff contained in a flexible laminated package , said flexible laminated package comprising an inner layer formed of a polystyrene foam film having anti-stick characteristics whereby when placed in said package, said hygroscopic foodstuffs will not adhere to said polystyrene inner layer.

2. The packaged foodstuff of claim 1 further including a foil layer adhered to said polystyrene foam film layer to inhibit moisture penetration.

3. The packaged foodstuff of claim 2 further including an outer layer adhered to said moisture inhibiting foil layer for receiving printing.

4. The packaged foodstuff of claim 3 wherein said foil layer is metallized film.

5. The packaged foodstuff of claim 4 wherein said metallized film is one of metallized paper and metallized polyethylene film.

6. The packaged foodstuff of claim 3 wherein the outer layer comprises a material selected from the group consisting of paper, polyolefins, vinyls, ionomers, styrene polymers and copolymers, polyamide, polyester and combinations thereof.

7. The packaged foodstuff of claim 1 wherein the polystyrene foam layer is partially coated with a cold seal adhesive.

8. The packaged foodstuff of claim 1 wherein the polystyrene foam layer is partially coated with a heat seal adhesive.

9. The packaged foodstuff of claim 1 wherein the polystyrene foam film has a thickness of from about 2 mils to about 25 mils.

10. The packaged foodstuff of claim 1 wherein the polystyrene foam film has a thickness of from 5 to 10 mils.

* * * * *